United States Patent [19]
Gross

[11] 3,902,103
[45] Aug. 26, 1975

[54] FILM SPEED CONTROL FOR SOUND MOTION PICTURE PROJECTOR

[75] Inventor: Thomas A. O. Gross, Lincoln, Mass.

[73] Assignee: Polaroid Corporation, Cambridge, Mass.

[22] Filed: Mar. 13, 1974

[21] Appl. No.: 450,554

Related U.S. Application Data

[62] Division of Ser. No. 374,638, June 28, 1973.

[52] U.S. Cl. .................. 318/227; 318/313; 318/345
[51] Int. Cl. .............................................. H02p 3/20
[58] Field of Search..................... 318/313, 345, 227

[56] References Cited
UNITED STATES PATENTS

| | | | |
|---|---|---|---|
| 3,424,967 | 1/1969 | Keller | 318/313 X |
| 3,504,255 | 3/1970 | L'Espepance | 318/212 X |
| 3,541,411 | 11/1970 | Sharp | 318/212 |
| 3,604,996 | 9/1971 | Lutz | 318/345 |
| 3,786,327 | 1/1974 | Dyer | 318/227 X |

*Primary Examiner*—B. Dobeck
*Attorney, Agent, or Firm*—John W. Ericson

[57] ABSTRACT

A sound motion picture system in which sound is recorded on movie film. A constant speed capstan drives the film past a sound transducer, and a claw drives the film incrementally past a film gate. A projection lamp, a DC power supply, and an induction motor for driving the claw are energized from a common source. A film loop between the transducer and the film gate controls a switching circuit for unbalancing the current to the induction motor to control the speed of the motor without materially affecting the rms value of the current supplied to the lamp or the peak - to - peak value of the voltage supplied to the DC power supply.

15 Claims, 5 Drawing Figures

FILM SPEED CONTROL FOR SOUND MOTION PICTURE PROJECTOR

This is a division of application Ser. No. 374,638, filed June 28, 1973.

BACKGROUND OF THE INVENTION

This invention relates to photography, and particulary to a novel film speed control system for sound motion pictures.

A classic problem in the art of recording and reproducing sound movies, of the kind in which a sound track is recorded along the movie film, is that the sound must be recorded and reproduced at the same uniform speed to avoid frequency distortion, commonly termed wow and flutter, whereas the film must be moved intermittently past the exposure or projection gate so that the sequence of still images can be properly exposed or projected. Various solutions to this problem have been proposed.

One proposed solution is the provision of a moving optical system which allows the film to move at a uniform speed through the film gate. So far as is known, this approach has not been widely adopted. It is characterized by the difficulty in designing an optical system, including moving mirrors or the like, which will reproducibly capture properly spaced frames during exposure, and, more particularly, to recapture the frames in proper registration on projection. The matter is complicated considerably by the need to maintain correct focus and to avoid distortion in the projected image.

A more common approach is to provide for a loop of film between the sound station and the film gate in which each image is projected or exposed. As the film is started and stopped at the projection gate, the loop is shortened and lengthened to allow the film to be moved uniformly past the sound station by a capstan. In order to maintain the loop, it has been proposed to sense its length and to control the speed of either the capstan or of the incremental drive at the film gate so that the film loop has a constant average length.

Particularly in projectors, where the projection lamp represents a substantial power demand, it is highly desirable to avoid film speed control systems which result in any substantial regulation of the power supply voltage. In addition to the lamp, a power supply is required to drive the various constant speed or variable speed motors used in the projector, to energize the various electronic circuits that may be provided, and to drive the blower that is usually employed to cool the projection lamp and its surroundings. Many otherwise suitable motor speed control systems would either place onerous requirements on the power supply or would not produce a sufficiently constant speed past the sound transducer.

Projectors are commonly required to operate from a conventional alternating voltage line, which is frequently a 60 Hz, nominally 120 volt line. Particularly for small film formats such as the conventional 8 mm or Super 8 formats, a light source of sufficient brightness and appropriately small size usually has the longest service life when designed to operate at a voltage well below 120 volts. One such commonly available projection lamp, for example, requires a voltage in the neighborhood of 20.5 volts AC for optimum performance.

It is, of course, quite possible to provide a separate transformer for operating the projection lamp. However, the large physical size, weight and cost of a transformer that will operate a 100 or 150 watt lamp at 20 volts from 120 volt source militates against its use.

One solution that has been proposed to this power supply problem involves the use of a combined motor and transformer in which the motor is of the shaded pole, induction type, and in which auxiliary windings on the ferromagnetic stator or the motor supply power for the projection lamp and other electrical components of the system. The rotor of this combined motor and transformer drives the blower for the system, and also drives the film advance claw of the projector, through a reciprocating mechanism of conventional design. A DC motor drives the sound capstan, through a flywheel, if desired.

Because the utmost uniformity in the speed of the film past the capstan is essential to good sound quality, it would be highly desirable to drive the capstan motor at a constant speed, and to adjust the speed of the combination motor and transformer so that the average speed of the film moved by the claw would be the same as the speed of the film past the sound transducer. However, so far as I am aware, prior to my invention, speed control systems for induction motors have involved regulation of both the rms and the peak - to - peak values of the voltage applied to the motor windings. That is undesirable in projectors of the kind described, for two reasons. The first is that material variations of the rms voltage applied to the projection lamp will change its brightness enough to visibly affect the quality of the projected image. Secondly, any variation in the peak - to - peak voltage will tend to vary the DC voltage derived for controlling the constant speed motor unless an elaborate regulating scheme is provided.

One object of my invention is to facilitate the control of the shaft speed of a combined motor and transformer without affecting the peak - to - peak value, and without materially affecting the rms value, of the transformer voltage. Another object of my invention is to simplify the design and construction of sound motion picture projectors. A more general object is to provide an improved speed control circuit for induction motors.

Briefly, the above and other objects of my invention are attained by novel modifications in the construction of a projector of the type having constant speed drive means for advancing a strip of movie film bearing a magnetic sound track at a constant speed past a transducer, and having a projection station past which the film can be incrementally advanced for projection with light from a projection lamp. A drive claw for incrementally moving the film past the projection station is driven by the rotor of a combination shaded pole induction motor and transformer. A conventional DC power supply is energized from a secondary winding on the stator of the combination motor and transformer. Energy for the lamp is supplied by one of the windings on the stator.

The primary winding of the combination motor and transformer is energized over a novel control circuit which admits one half-cycle of the line voltage without appreciable attenuation, and admits most of the other half-cycle of the line voltage, that portion admitted being also without substantial attenuation. A portion of the controlled half-cycle of the line voltage, near the zero crossing of the line voltage, is not admitted to the primary winding. This portion is gated out by a control circuit under the control of a voltage responsive gate which has an effective time constant under the control of photocell.

The photocell senses the length of a loop in the film between the sound transducer and the film gate to selectively interrupt a portion of one half-cycle of the line voltage. This action induces a DC unbalance in the motor drive voltage which acts as a brake on the motor. Variable application of the braking force enables the motor to be controlled so that its average speed is fixed relative to the capstan speed. I have found that adequate regulation of the motor speed can be provided in this way without affecting the peak - to - peak value of the motor voltage, and with only very minor variations in the rms value of the transformer voltages.

The manner in which the apparatus of my invention is constructed, and its mode of operation, will best be understood in the light of the following detailed description, together with the accompanying drawings, of various illustrative embodiments.

Figure 1:
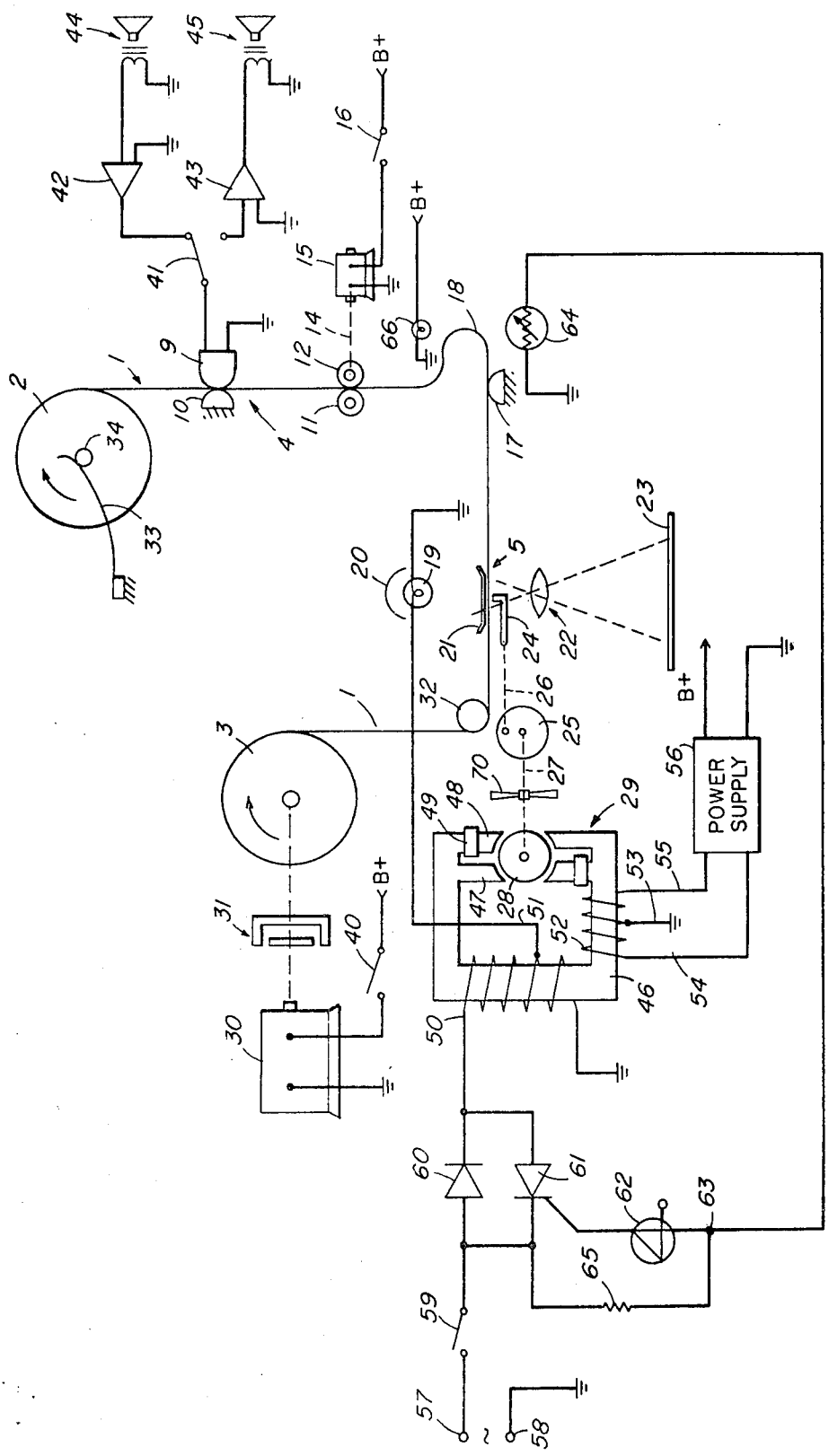
FIG. 1 is a schematic block and wiring diagram of a motion picture projector in accordance with my invention.

Referring to FIG. 1, there is shown a motion picture projection system which may be of conventional construction except as specifically noted. In particular, a strip of motion picture film generally designated 1 is shown extending between a supply reel 2 and a take-up reel 3 over a path through a playback station generally designated 4 and a projection station generally designated 5.

The film 1 may be provided along at least one edge with a series of regularly spaced sprocket holes that serve in a conventional manner to cooperate with incremental drive apparatus for allowing the film to be advanced a frame at a time past the projection station 5. On the film 1 are photographically recorded frames, each comprising a photographic transparency in a motion picture sequence, which frames are adapted to be viewed by intermittent projection in sequence.

Along at least one edge of the film 1 there is a conventional strip of magnetic material, such as magnetic iron oxide or the like, on which a sound track can be recorded, either as the film is being exposed, or after it has been exposed and developed. Alternatively, the sound track can be photographically recorded, and reproduced by photoelectric means.

The sound track on the film cooperates with a conventional playback head 9, of the electromagnetic type for magnetic recording. The head 9 is arranged to engage the sound track at the playback station 4, and to be urged into light engagement with the surface of the film 1 for that purpose by means schematically indicated as a resilient pressure pad 10.

The film 1 extends from the supply reel 2 through the playback station 4 just described, and thence between an idler roll 11 and a capstan 12. The capstan 12 is arranged to be drive at constant speed by the shaft 14 of a conventional DC motor 15. The motor 15 is driven at constant speed by a constant voltage at a potential B+ with respect to ground when a switch 16 is closed. In addition to, or in place of the provision of a constant DC supply voltage for the motor 15, any conventional motor speed control circuit may be incorporated, if so desired, and a flywheel may be connected to the shaft 14 to further regulate the speed of the capstan 12. The material point, so far as my invention is concerned, is that the speed of the capstan is sufficiently constant to keep wow and flutter within acceptable limits.

From the capstan 12, the film 1 next passes over a fixed guide 17, mounted on the frame of the apparatus in any conventional manner, not shown, and thence through the projection station 5. As indicated, the film 1 is free to form a loop 18 between the capstan and the projection station.

At the projection station 5, conventional projection apparatus is provided comprising a lamp 19 provided with a reflector 20 arranged to direct a beam of light through a suitable framing aperture, not shown, in a conventional pressure plate 21. The pressure plate 21 serves to locate the focal plane of the film 1. Light transmitted through the film passes through a conventional lens system, schematically indicated at 22, onto any convenient viewing screen schematically shown at 23.

The film is arranged to be incrementally advanced past the projection station by a conventional film drive mechanism, schematically shown as comprising a drive pawl 24 connected to a crank 25 as suggested at 26. The crank 25 is arranged to be rotated by a shaft 27 driven by the rotor 28 of a combined transformer and shaded pole induction motor generally designated 29. As schematically indicated, the shaft 27 also drives a blower 70 to cool the lamp 19 and its surroundings. The combined transformer and shaded pole induction motor 29 may be of conventional construction.

As the shaft 27 rotates the crank 25, the pawl 24 is reciprocated and oscillated in a conventional manner to engage successive sprocket holes in the film 1 and advance the film by increments of one frame length. After each such movement, the pawl 24 disengages the film and returns to the position for the next feed stroke in engagement with the subsequent sprocket hole 6. This operation will be familiar to those familiar with motion picture projectors, and need not be further described.

The take-up reel 3 for the film 1 arranged to be driven by a motor 30 through a slip clutch 31. The motor 30 may be a conventional DC motor arranged to be supplied with drive current from the supply terminal at B+. The motor 30 is arranged to be supplied with operating current at times when a conventional switch 40 is closed to complete a circuit from the supply terminal at B+ and through the motor winding to ground. The fixed speed of the motor 30 is selected to be in excess of the maximum speed of the film 1 produced by the intermittent reciprocation of the pawl 24.

The film 1 extends from the projection station 5 over a snubber roll 32 to the take-up reel 3. The snubber roll 32 is stopped in a conventional manner, during projection of the film, so that the take-up reel 3 is unable to advance the film 1, because the clutch 31 slips, except each time that the pawl 24 advances the film 1 to loosen it from the snubber roll and allow an increment to be taken up by the reel 3. This action is conventional.

The transducer head 9 has a conventional winding with terminals extending between ground and the armature of a conventional switch 41 which selectively connects the head 9 to the output circuit of an amplifier 42, to allow sound to be recorded on the film 1, or to the input circuit of an amplifier 43, to allow sound recorded on the film 1 to be reproduced. For this purpose, a conventional microphone generally designated 44 is connected to the input circuit of the amplifier 42, and a conventional speaker, schematically indicated at 45, is connected to the output circuit of the amplifier 43.

It will be generally apparent that the apparatus just described will operate to record sound on, or reproduce sound from, the film strip 1, depending on the position of the switch 41, while projecting the film onto the screen 23, with appropriate correspondence between picture and sound so long as the length of the loop 18 is maintained constant by control of the speed of reciprocation of the film drive pawl 24. Apparatus for controlling the speed of the combined motor and transformer 29 in order to accomplish this result will next be described.

The motor and transformer 29 comprises a conventional stator 46 having pairs of poles such as 47 and 48, one pole of each pair, such as 48, being provided with a conventional short-circuited shading coil 49. A primary winding 50 on the stator 46 supplies energizing current for the motor, and is tapped as indicated at 51 to provide a suitable source for voltage for energizing the lamp 19. The primary winding 50 also supplies energizing current for a secondary winding 52, having a center tap connected to ground as indicated at 53, and leads 54 and 55, balanced with respect to ground, connected to the input terminals of the conventional DC power supply 56. When energized, the power supply 56 supplies a fixed DC potential B+ with respect to ground, used for energizing other apparatus in the system.

An energizing circuit for the winding 50 extends from a pair of conventional input terminals 57 and 58 adapted to be connected to a conventional source of alternating current, such as a 60 Hz, 120 volt source. The terminal 58 is connected to a reference ground, and the terminal 57 is connected over a switch 59 to a first path from the anode to the cathode of a conventional diode 60, and thence through the primary winding 50 of the combined motor and transformer 29 to ground.

A second path from the switch 59 to the upper terminal 50 of the winding 50 extends from the switch 59 to the cathode of a conventional silicon controlled rectifier, or SCR, 61. The anode of the silicon controlled rectifier 61 is connected to the upper terminal of the winding 50, as shown.

The gate of the silicon controlled rectifier 61 is connected to one load terminal of a conventional silicon unilateral switch, or SUS, 62. The gate of the SUS 62 is not used in the circuit.

The SUS is a conventional device which breaks down when a voltage in the range of from 6 to 10 volts, depending upon the particular device selected, is applied across its load terminals. When this threshold voltage is exceeded, the impedance across the load terminals falls, so that the device serves as a voltage responsive switch.

The load terminal 63 of the SUS 62 is connected through a conventional photocell 64 to ground. A resistor 65 is connected between the terminal 63 and the cathode of the silicon controlled rectifier 61.

It can be shown that when the input terminal 57 goes negative with respect to ground, the voltage at the terminal 63 will rise relative to the voltage on the cathode of the SCR 61 at a rate determined by the ratio of the resistance of the photocell 64 to the total resistance of the photocell 64 and the resistor 65 in series, times the rate of increase of the input voltage. Thus, the potential at the terminal 63 will reach the threshold voltage triggering the SUS 62 into conduction after a time dependent on the current impedance of the photocell 64, as determined by the light falling on it.

The photocell 64 is adapted to be illuminated at times by a conventional lamp 66. The lamp 66 is energized by current from the DC power supply source at B+, the power supply being connected through the filament of the lamp 66 to ground as shown, to be illuminated when the switch 59 is closed so that the power supply 56 is energized. The optical path between the lamp 66 and the photocell 64 is adapted to be interrupted by the loop 18 formed in the film 1, when the latter is of a predetermined length.

The photosensitive element of the photocell 64 is preferably somewhat elongated so that it is progressively obscured by the loop 18 as it grows in length, rather than being abruptly obliterated. Typically, the resistance of the photoconductor 64 is low when brightly illuminated, and higher as the illumination falls off. Thus, when the photocell 64 is completely exposed to the lamp 66, it exhibits a low value of resistance, so that the threshold voltage required to trigger the SUS 62 is reached relatively late in the half-cycle during which the terminal 57 goes negative.

Figure 2:
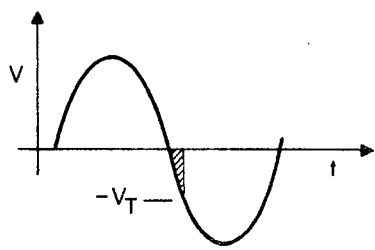
FIG. 2 is a graph illustrating the operation of a portion of the apparatus of FIG. 1.

When the SUS 62 is triggered, the SCR 61 is gated into conduction so that the remainder of the negative half-cycle of the line voltage on the terminal 57 flows through the winding 50 of the combined motor and transfomer 29. Referring to FIG. 2, a typical cycle of voltage at the upper terminal of the winding 50 with respect to ground is shown.

As illustrated, the positive half-cycle flows through the winding without interruption. However, as the voltage at the terminal 57 goes negative, conduction does not occur until the voltage $-V_T$ at terminal 63 is reached, at which time the SCR 61 will be gated into conduction. Thereafter, the remainder of the negative half-cycle flows through the winding 50. The result is a net DC unbalance of the motor voltage which serves as a brake on the motor.

It has been found that adequate regulation of the speed of the rotor 28 of the motor and transformer 29 can be achieved by a control of one half-cycle of the line voltage within 0° to 10° from the zero crossing point. It will be apparent from FIG. 2 that this control will not affect the peak-to-peak value of the voltage across the winding 50. Therefore, the power supply 56 will see the same peak-to-peak value whether or not the voltage is regulated. The rms voltage, which determines the brillance of the lamp 19, can be shown to be very little affected by control of the firing angle on one half-cycle over the range of 0° to 10°. Specifically, assuming that the line voltage $V$ is of the form $V = A\sin\theta$, the rms value of the complete wave form is given by $$V_{rms} = \sqrt{\frac{1}{2\pi}\int_0^{2\pi} A^2\sin^2\theta\,d\theta} = .707A$$

If a portion of one half-cycle of the wave is clipped from the zero crossing to 10° beyond the zero crossing, the loss in the rms voltage is given by $$V_L = \sqrt{\frac{1}{2\pi}\int_0^{\frac{\pi}{18}} A^2\sin^2\theta\,d\theta} = A\sqrt{\frac{1}{2\pi}\left[\frac{\theta}{2} - \frac{\sin 2\theta}{4}\right]_0^{\frac{\pi}{18}}}$$

$$V_L \cong .017A \cong 2.4\% V_{rms}$$

Thus, full regulation over the ten-degree interval will result in only about a 2.4 per cent change in the rms voltage.

Operation of the system of FIG. 1 will be generally apparent from the above description. Briefly, however, assume that the film 1 is primarily disposed on the supply reel 2, and that the film is essentially stretched tightly between the supply reel and the take-up reel 3 over a path through the playback station 4, through the capstan 12 and idler 11, over the guide 17, through the projection station 5, and thence over the snubber roll 32 to the supply reel 3. In this state of the apparatus, there will no loop 18, and the film 1 will be clear of the optical path between the lamp 66 and the photocell 64.

Assume next that the switches 59, 40 and 16 are closed, so that the motors 30, 15 and 29 begin to operate. The lamp 66 will be illuminated, and the resistance of the photocell 64 will initially be quite low because it is fully illuminated by the lamp in the absence of a loop 18 in the film 1. Accordingly, the rotor 28 of the combined motor and transformer 29 will begin to rotate slowly, because most of the voltage applied to the line terminal 57 on the negative half-cycle of the line voltage will appear across the resistor 65, so that it will be later in each half-cycle before the SUS 62 breaks down and causes the SCR 61 to conduct.

The initial average speed of the film moved by the claw 24 will be lower than the speed of the film produced by the capstan 12 under the influence of the motor 15. Accordingly, a loop 18 will build up until the photocell 64 begins to be shaded from the lamp 66. When that occurs, a higher percentage of the negative half-cycle voltage will appear across the photocell 64, causing the SUS 62 to break down earlier in the negative half-cycle, and therefore allow the rotor of the motor 29 to speed up, until the loop 18 reaches a stable average position about which it will fluctuate to keep the average speed of the film past the projection station 5 equal to the speed past the playback station 4.

It will be apparent that if the projection rate is, for example, 18 frames per second, the trigger voltage VT (FIG. 2) at which the SUS 62 in FIG. 1 will conduct will be reached at differing intervals during the negative half-cycle, so that the firing angle will fluctuate in a periodic fashion repeated approximately every three cycles of the line voltage. This fluctuation will be integrated by the inertia of the motor so that it will not be appreciable in the projection rate.

Figure 3:
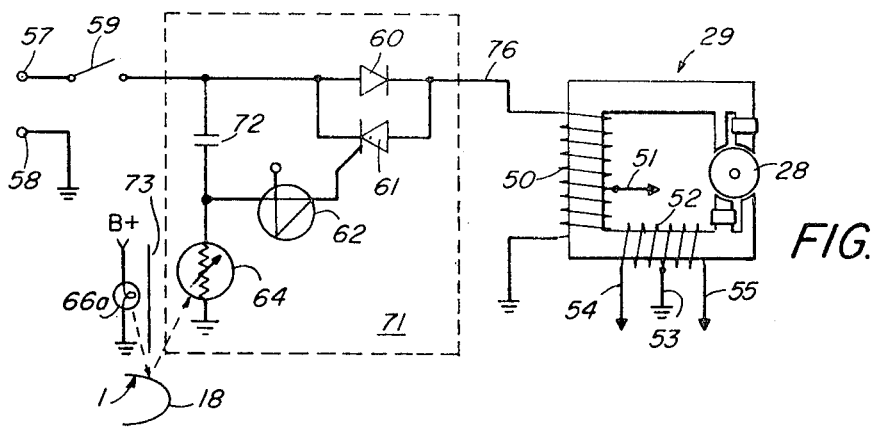
FIG. 3 is a schematic wiring diagram of a shaded pole induction motor and transformer control system in accordance with another embodiment of my invention.

FIG. 3 shows an alternate embodiment of the speed control of my invention in which a capacitor 71 is substituted for the resistor 65 in the circuit of FIG. 1. As will appear, this circuit is one in which the control logic is inverted, so that a corresponding change must be made in the arrangement of the parts in the system of FIG. 1 in order to secure the same mode of operation, as will appear.

Referring to FIG. 3, in which parts corresponding to those in FIG. 1 have been given corresponding reference characters, the control circuit for the winding 50 of the combined motor and transformer 29 extends through the diode 60, for the positive half-cycle of the line voltage, and through the load terminals of the SCR 61 for the negative half-cycle, as before. The gate circuit for the SCR 61 is modified by the substitution of a capacitor 72 for the resistor 65 of FIG. 1.

The result is that the more the photocell 64 is illuminated, the more rapidly the capacitor 72 will be charged during the negative half-cycle of the line voltage on the terminal 57. In particular, the time constant is given by the product of the capacitance of the capacitor 72 and the resistance of the photocell 64.

With the photocell fully illuminated, the voltage across the photocell to rise rapidly to the value at which the SUS will conduct, gating the SCR 61 into conduction to permit passage of the remainder of the half-cycle as indicated in FIG. 2. Referring to FIG. 1, it will be seen that with the photocell 64 initially fully illuminated in the absence of the loop 18, the motor 27 would begin to operate more rapidly. The system of FIG. 1 would not operate properly under those circumstances without modification.

One modification that would permit operation of the system of FIG. 1 with the circuit of FIG. 3 would be to interchange the sound station and the projection station, such that the film was moved incrementally toward the sound station by the projection claw 24. Thus, the motor and transformer 29 would be required to operate more rapidly until the loop 18 was formed at the proper length.

Another modification in the system of FIG. 1 that would permit proper operation of the circuit of FIG. 3 is illustrated in FIG. 3. As there shown, the lamp or other light source 66a is shielded to prevent direct illumination of the photocell 64 by means schematically indicated as a shield 73. No light from the lamp 66a thus reaches the photocell 64 in the absence of the loop 18. When the loop 18 is formed, light reflected from the film 1 reaches the photocell 64, causing the SUS 62 to break down earlier in the cycle and speeding up the motor, and thus operating in the same manner as the control circuit of FIG. 1 to run the motor-transformer slowly until the loop is built up, and then increase its speed to maintain a constant loop size.

Figure 4:
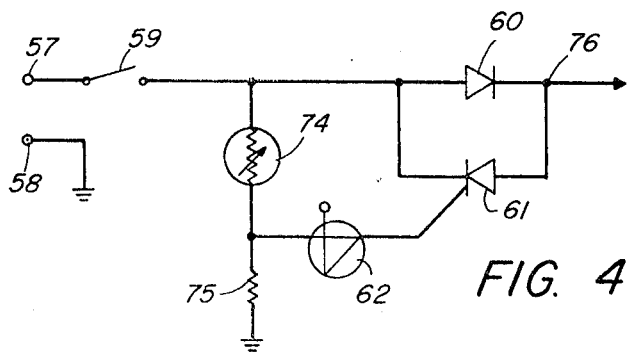
FIG. 4 is a schematic wiring diagram of an alternate embodiment of the speed control circuit of FIG. 3, useful for applications in which inverted logic is required.

FIG. 4 illustrates another modification of the speed control portion 71 of the circuit of FIG. 3. In this configuration, the diode 60 is connected with the SCR 61 as before, and the SUS 62 is connected in series with a resistor 75 between the gate of the SCR 61 and ground. A photocell 74 is connected between the cathode of the SCR 61 and the junction of the SUS and the resistor 75. By this arrangement, illumination of the photocell causes a higher proportion of the voltage on the terminal 77 to appear across the resistor 75, thus causing the SUS 62 to conduct earlier in the cycle and thereby increase the speed of the motor of FIG. 3. That causes more light to increase the speed of the motor, and less light to decrease the speed of the motor, in the same manner as the circuit of FIG. 3.

Figure 5:
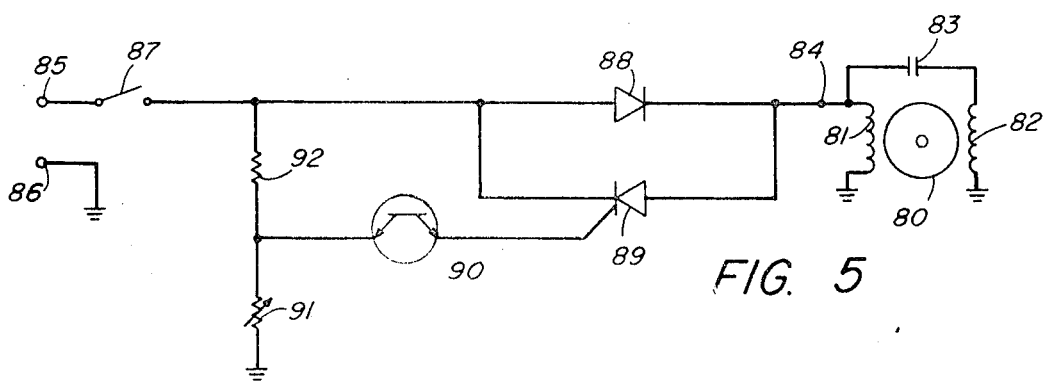
FIG. 5 is a schematic wiring diagram of a modification of the speed control circuit of FIG. 3, shown in combination with another form of induction motor.

FIG. 5 shows an alternate embodiment of my invention in its broader aspects, comprising a speed control for another form of induction motor, namely a split-phase induction motor. As schematically illustrated, the motor comprises a rotor 80, a first winding 81, and a second winding 82 connected in series with a phasing capacitor 83. As shown, the winding 81 is connected between an input terminal 84 and ground, and the capacitor 83 and winding 82 and connected in series between the terminal 84 and ground.

The motor 83 is adapted to be energized from a conventional source of alternating current connected between a input terminal 85 and a grounded terminal 86. The terminal 85 is connected to the terminal 84 over an on-off switch 87, and hence through a first path including a diode 88 to the terminal 84. A second path extends from the switch 87 in its closed position from the cathode to the anode of a silicon controlled rectifier 89, and thence to the terminal 84. The gate terminal of the SCR 89 is connected to ground over the load terminals of a conventional diac 90, and thence through a variable resistor 91 to ground. The variable resistor 91 may be a photoconductor, as in the previously described embodiments, or it may be a manually or automatically variable resistor of other design.

The junction of the variable resistor 91 and the diac 90 is returned to the cathode of the SCR 89 through a fixed resistor 92. The diac in the circuit of FIG. 5 serves the same purpose as the SUS in the previously described embodiments, and in fact, may be substituted for the SUS in those embodiments if so desired.

In operation, when the switch 87 is closed, the diac 90 will conduct at a voltage, typically between 28 – 36 volts, that is reached at a point in the negative going half-cycle of the line voltage applied to the terminal 85 determined by the ratio of the resistor 91 to the total resistance of the resistors 91 and 92. When the diac 90 conducts, the SCR 89 will be gated into conduction to pass the remainder of the negative half-cycle as illustrated in FIG. 2. The result will be a DC unbalance signal introduced into the windings of the motor, causing the motor to run at a slower speed. Increasing the resistance of the resistor 91 will cause the diac 90 to conduct earlier in the cycle, and thus apply less DC bias to the motor. Thus, by varying the resistance of the resistor 91, the speed of the motor can be controlled.

While I have described my invention with respect to the details of various illustrative embodiments thereof, many changes and variations will occur to those skilled in the art upon reading my description. Such can obviously be made without departing from the scope of my invention.

Having thus described my invention, what I claim is:

1. A speed control circuit for regulating the shaft speed of a combination induction motor and transformer having a winding adapted to be energized with alternating current and a winding adapted to be connected to an external load, comprising a rectifier connected in series with said winding to admit half cycles of an applied alternating current of a first polarity to said winding, and electronic switch connected in parallel with said rectifier, and adjustable voltage responsive means connected to said switch for closing said switch to admit a portion of half cycles of an applied alternating current to said winding when the voltage of said applied current reaches a predetermined value with a polarity opposite said first polarity, said voltage responsive means being limited in its adjustment to limit said predetermined value to a range which occurs within ten electrical degrees of the zero crossing of said applied current so that the speed regulation effected will not appreciably vary the effective value of the current.

2. In combination, a pair of input terminals adapted to be connected to a source of alternating voltage, a rectifier, an induction motor having a winding, an external load, at least a portion of said winding being connected to said load, means connecting said rectifier and said winding in series between said terminals to allow the flow of current of a first polarity through said winding in response to an alternating voltage applied to said input terminals, a first impedance, a second impedance, one of said impedances being a variable impedance, means connecting said first and second impedances in series between said input terminals, an electronic switch having load terminals connected in parallel with said rectifier and a control terminal responsive to an applied signal to produce a low impedance path across said load terminals, and voltage responsive switching means connected between said control terminal and the junction of said impedances to apply a signal to said control terminal when the voltage across one of said impedances reaches a predetermined value within ten degrees of the zero crossing of the voltage across said input terminal and the polarity of the voltage across said input terminal is opposite said first polarity, whereby the speed of said motor can be regulated by varying said variable impedance without substantially varying the effective value of the current supplied to said external load.

3. The apparatus of claim 2, in which said variable impedance is a variable resistor.

4. The apparatus of claim 3, in which said variable resistor is a photoconductor.

5. The apparatus of claim 3, in which the other of said impedances is a capacitor.

6. The apparatus of claim 2, in which said electronic switch is a silicon controlled rectifier, and in which said voltage responsive switching means is a silicon unilateral switch.

7. The apparatus of claim 2, in which said electronic switch is a silicon controlled rectifier, and in which said voltage responsive switching means is a diac.

8. The apparatus of claim 2, in which said motor is a split phase induction motor.

9. The apparatus of claim 2, in which said motor is a shaded pole induction motor.

10. The apparatus of claim 9, in which said motor comprises a stator on which said winding is disposed, and further comprising a secondary winding on said stator adapted to supply power to an external circuit when said first recited winding is energized with alternating current.

11. A motor speed control circuit, comprising, in combination, a pair of terminals adapted to be connected to a source of alternating voltage, a fixed impedance and a variable impedance connected in series between said terminals, an induction motor having a winding, a load impedance, means responsive to the effective value of the current flowing through said winding for energizing said load impedance with a current having a corresponding effective value, a diode having a cathode and an anode, means connecting said diode and said winding in series between said terminals to allow the passage of current of a first polarity through said winding in response to alternating voltage applied to said terminals, a controlled rectifier having a cathode connected to the anode of said diode, an anode connected to the cathode of said diode, and a gate terminal responsive to an applied signal to allow the flow of electrons from the cathode to the anode of said controlled rectifier, and voltage responsive switching means connected between said gate terminal and the junction of said impedances to apply a signal to said gate terminal when the voltage across one of said impedances reaches a predetermined amplitude occuring within ten degrees of the zero crossing of the current through said winding and the anode of said controlled rectifier is positive with respect to the cathode of said controlled rectifier, whereby the speed of said motor may be appreciably regulated without appreciable regulation of the effective value of the current supplied to said load impedance.

12. The apparatus of claim 11, in which said fixed impedance is a resistor.

13. The apparatus of claim 11, in which said fixed impedance is a capacitor.

14. The apparatus of claim 11, in which said variable impedance is photosensitive.

15. The apparatus of claim 11, in which said motor has an output shaft, and further comprising means responsive to the speed of said shaft relative to the speed of a reference shaft for controlling the impedance of said variable impedance to maintain a fixed relation between the speed of said shafts.

* * * * *